US008144572B2

(12) United States Patent
Shoemake et al.

(10) Patent No.: US 8,144,572 B2
(45) Date of Patent: Mar. 27, 2012

(54) DETECTION AND MITIGATION OF INTERFERENCE AND JAMMERS IN AN OFDM SYSTEM

(75) Inventors: Matthew B. Shoemake, Allen, TX (US); Sridhar Rajagopal, Allen, TX (US); John D. Terry, Garland, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1022 days.

(21) Appl. No.: 11/226,654

(22) Filed: Sep. 14, 2005
(Under 37 CFR 1.47)

(65) Prior Publication Data
US 2006/0211377 A1 Sep. 21, 2006

Related U.S. Application Data

(60) Provisional application No. 60/609,623, filed on Sep. 14, 2004.

(51) Int. Cl.
*H04J 11/00* (2006.01)
(52) U.S. Cl. ......... 370/208; 370/203; 370/206; 375/260
(58) Field of Classification Search .......... 370/208, 370/203, 206, 260, 281, 480, 468, 389, 335, 370/349, 280, 329, 328, 342, 292, 375; 375/260, 375/285, 326, 132, 133, 222, 265, 239, 316, 375/341, 346, 376; 455/63.1, 67.11, 41.2, 455/67.13, 56, 67, 69, 447, 450, 127.1, 452.1, 455/423, 522
See application file for complete search history.

(56) References Cited

U.S. PATENT DOCUMENTS

| 5,351,274 | A | * | 9/1994 | Chennakeshu et al. | 375/347 |
| 5,465,271 | A | * | 11/1995 | Hladik et al. | 375/267 |
| 5,541,955 | A | * | 7/1996 | Jacobsmeyer | 375/222 |
| 6,044,107 | A | * | 3/2000 | Gatherer et al. | 375/222 |
| 6,201,955 | B1 | * | 3/2001 | Jasper et al. | 455/277.2 |
| 6,302,576 | B1 | * | 10/2001 | Ono et al. | 714/794 |

(Continued)

OTHER PUBLICATIONS

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

(Continued)

*Primary Examiner* — Chi Pham
*Assistant Examiner* — Abdullah Riyami
(74) *Attorney, Agent, or Firm* — Nicholas J. Pauley; Peter M. Kamarchik; Jonathan T. Velasco (57) ABSTRACT

The present invention provides a method and apparatus for detecting interference in a wireless communications system. The invention compares the receiver FFT output of a received signal against known sequences such as the packet synchronization sequence, frame synchronization sequence, and channel estimation sequence. By comparing the reference signal to the known sequences, the invention estimates the instantaneous signal to noise ratio (SNR) for each tone of a wireless transmission. To improve the SNR estimate, the invention computes a weighted average across multiple OFDM symbols. The invention looks for significant increases (spikes) in the SNR as a way of distinguishing interfering signals from noise. The invention can store separate SNR estimates for each transmitter in a wireless network. One embodiment of the invention uses Viterbi branch metrics in conjunction with the estimated SNR to determine the presence of an interfering signal. If interference is detected the invention feeds the inverse of the SNR estimate into the Viterbi decoder or declares and erasure for that symbol.

33 Claims, 4 Drawing Sheets

U.S. PATENT DOCUMENTS

| | | | |
|---|---|---|---|
| 6,466,629 B1 * | 10/2002 | Isaksson et al. | 375/316 |
| 6,650,716 B1 * | 11/2003 | Ratnarajah | 375/347 |
| 6,839,379 B1 * | 1/2005 | Horng et al. | 375/148 |
| 6,928,062 B2 | 8/2005 | Krishnan et al. | |
| 6,983,030 B2 * | 1/2006 | Storm et al. | 375/350 |
| 7,010,055 B2 * | 3/2006 | Harrison et al. | 375/267 |
| 7,039,001 B2 | 5/2006 | Krishnan et al. | |
| 7,200,123 B2 | 4/2007 | Lopez Medrano | |
| 7,203,179 B2 * | 4/2007 | Wang et al. | 370/328 |
| 7,203,261 B2 | 4/2007 | Gupta | |
| 7,221,911 B2 * | 5/2007 | Knobel et al. | 455/42 |
| 7,263,118 B2 | 8/2007 | Choi et al. | |
| 7,313,190 B2 * | 12/2007 | Balakrishnan et al. | 375/260 |
| 7,362,817 B2 * | 4/2008 | Ojard | 375/285 |
| 7,428,270 B1 * | 9/2008 | Dubuc et al. | 375/316 |
| 7,453,793 B1 | 11/2008 | Jones, IV et al. | |
| 7,463,576 B2 | 12/2008 | Krishnan et al. | |
| 7,545,852 B2 | 6/2009 | Fernandez-Corbaton et al. | |
| 7,548,576 B2 * | 6/2009 | Dowla et al. | 375/130 |
| 7,593,339 B2 | 9/2009 | Shoemake et al. | |
| 7,593,478 B2 | 9/2009 | Shoemake | |
| 7,602,866 B2 | 10/2009 | Olsson et al. | |
| 7,634,034 B2 | 12/2009 | Larsson | |
| 7,764,594 B2 | 7/2010 | Walton et al. | |
| 7,830,782 B2 | 11/2010 | Shoemake et al. | |
| 7,844,018 B2 | 11/2010 | Tian et al. | |
| 7,869,529 B2 | 1/2011 | Rajagopal et al. | |
| 8,009,551 B2 | 8/2011 | Wang | |
| 8,009,750 B2 | 8/2011 | Chrabieh et al. | |
| 2001/0014114 A1 * | 8/2001 | Baltersee et al. | 375/148 |
| 2001/0050926 A1 * | 12/2001 | Kumar | 370/529 |
| 2002/0101908 A1 * | 8/2002 | Kim et al. | 375/147 |
| 2002/0110138 A1 * | 8/2002 | Schramm | 370/430 |
| 2002/0131398 A1 * | 9/2002 | Taylor | 370/350 |
| 2002/0181421 A1 * | 12/2002 | Sano et al. | 370/335 |
| 2003/0053521 A1 * | 3/2003 | Huang et al. | 375/144 |
| 2003/0063596 A1 * | 4/2003 | Arslan et al. | 370/347 |
| 2003/0196158 A1 * | 10/2003 | Leung | 714/776 |
| 2003/0198305 A1 * | 10/2003 | Taylor et al. | 375/341 |
| 2003/0202568 A1 * | 10/2003 | Choi et al. | 375/148 |
| 2003/0231715 A1 * | 12/2003 | Shoemake et al. | 375/267 |
| 2004/0001556 A1 * | 1/2004 | Harrison et al. | 375/267 |
| 2004/0001563 A1 * | 1/2004 | Scarpa | 375/326 |
| 2004/0028154 A1 * | 2/2004 | Yellin et al. | 375/341 |
| 2004/0038658 A1 * | 2/2004 | Gurelli et al. | 455/226.3 |
| 2004/0077306 A1 * | 4/2004 | Shor et al. | 455/1 |
| 2004/0114506 A1 * | 6/2004 | Chang et al. | 370/208 |
| 2004/0141548 A1 * | 7/2004 | Shattil | 375/146 |
| 2004/0151109 A1 * | 8/2004 | Batra et al. | 370/208 |
| 2004/0174925 A1 * | 9/2004 | Sanada | 375/130 |
| 2004/0185787 A1 * | 9/2004 | Molisch et al. | 455/67.11 |
| 2004/0240379 A1 * | 12/2004 | Tsuie | 370/210 |
| 2004/0259555 A1 * | 12/2004 | Rappaport et al. | 455/446 |
| 2005/0008092 A1 * | 1/2005 | Kadous | 375/267 |
| 2005/0013387 A1 * | 1/2005 | Ojard | 375/316 |
| 2005/0018750 A1 * | 1/2005 | Foerster et al. | 375/130 |
| 2005/0047444 A1 * | 3/2005 | Park et al. | 370/480 |
| 2005/0058151 A1 * | 3/2005 | Yeh | 370/445 |
| 2005/0111596 A1 * | 5/2005 | Olsson et al. | 375/346 |
| 2005/0135229 A1 * | 6/2005 | Molisch et al. | 370/208 |
| 2005/0135324 A1 * | 6/2005 | Kim et al. | 370/343 |
| 2005/0164642 A1 * | 7/2005 | Roberts | 455/67.13 |
| 2005/0176371 A1 * | 8/2005 | Palin et al. | 455/41.2 |
| 2005/0180375 A1 * | 8/2005 | Batra et al. | 370/344 |
| 2005/0190800 A1 * | 9/2005 | Maltsev et al. | 370/914 |
| 2005/0190817 A1 * | 9/2005 | Batra et al. | 375/130 |
| 2005/0201287 A1 * | 9/2005 | Welborn | 370/235 |
| 2005/0201446 A1 * | 9/2005 | Bar-Ness et al. | 375/130 |
| 2005/0232137 A1 * | 10/2005 | Hosur et al. | 370/208 |
| 2005/0237921 A1 * | 10/2005 | Showmake | 370/208 |
| 2005/0265220 A1 * | 12/2005 | Erlich et al. | 370/208 |
| 2005/0265221 A1 * | 12/2005 | Batra et al. | 370/208 |
| 2005/0271088 A1 * | 12/2005 | Shoemake et al. | 370/528 |
| 2005/0276353 A1 * | 12/2005 | Bobier et al. | 375/322 |
| 2006/0008035 A1 * | 1/2006 | Larsson | 375/343 |
| 2006/0013259 A1 * | 1/2006 | Chari et al. | 370/482 |
| 2006/0039275 A1 * | 2/2006 | Walton et al. | 370/208 |
| 2006/0039346 A1 * | 2/2006 | Shapiro | 370/349 |
| 2006/0087960 A1 * | 4/2006 | Kim et al. | 370/203 |
| 2006/0093077 A1 * | 5/2006 | El Fawal et al. | 375/343 |
| 2006/0133451 A1 * | 6/2006 | Birru et al. | 375/130 |
| 2006/0166691 A1 * | 7/2006 | Medrano | 455/522 |
| 2006/0171445 A1 * | 8/2006 | Batra et al. | 375/130 |
| 2007/0008219 A1 * | 1/2007 | Hoffmann et al. | 342/367 |
| 2007/0009011 A1 * | 1/2007 | Coulson | 375/144 |
| 2007/0014271 A1 * | 1/2007 | Lai | 370/342 |
| 2007/0064744 A1 * | 3/2007 | Aytur et al. | 370/503 |
| 2007/0086513 A1 * | 4/2007 | Fernandez-Corbaton et al. | 375/148 |
| 2007/0211786 A1 * | 9/2007 | Shattil | 375/141 |
| 2007/0291636 A1 | 12/2007 | Rajagopal et al. | |
| 2008/0003954 A1 * | 1/2008 | Matsuno | 455/88 |
| 2008/0069255 A1 * | 3/2008 | Balakrishnan et al. | 375/260 |
| 2008/0075033 A1 * | 3/2008 | Shattil | 370/328 |
| 2008/0163024 A1 * | 7/2008 | Lakkis | 714/752 |
| 2008/0311948 A1 * | 12/2008 | Hans et al. | 455/522 |
| 2009/0161804 A1 | 6/2009 | Chrabieh et al. | |
| 2009/0252123 A1 * | 10/2009 | Iacono et al. | 370/335 |
| 2009/0304100 A1 | 12/2009 | Brehler et al. | |
| 2010/0290451 A1 * | 11/2010 | Karaoguz et al. | 370/347 |
| 2011/0044411 A1 | 2/2011 | Tian et al. | |

OTHER PUBLICATIONS

Viterbi, "Error Bounds for Convolutional Codes and an Asymptotically Optimum Decoding Algorithm," IEEE Transactions on Information Theory, vol. IT-13, No. 2, Apr. 1967, pp. 260-269.

Weinstein, S.B. et al., "Data Transmission by Frequency-Division Multiplexing Using the Discrete Fourier Transform," IEEE Transactions on Communications Technology, vol. Com-19, No. 5, Oct. 1971.

Weinstein et al., "Data Transmission by Frequency-Division Multiplexing Using the Discrete Fourier Transform", IEEE Transactions on Communication Technology, vol. COM-19, No. 5, Oct. 1971, pp. 628-634.

Joseph, Brian C. et al., U.S. Appl. No. 12/014,035, filed Jan. 14, 2008 for "Detection Of Interferers Using Divergence Of Signal Quality Estimates".

* cited by examiner

DETECTION AND MITIGATION OF INTERFERENCE AND JAMMERS IN AN OFDM SYSTEM

CROSS-REFERENCE TO RELATED APPLICATIONS

This application claims the benefit of and priority to U.S. Provisional Patent Application No. 60/609,623 filed Sep. 14, 2004 the technical disclosures of which are hereby incorporated herein by reference.

TECHNICAL FIELD

The present invention relates generally to wireless communications systems, such as a multi-band OFDM (Orthogonal Frequency Division Multiplexing) communication system. More specifically, the present invention relates to a method for avoiding and mitigating interference from extraneous wireless systems.

BACKGROUND OF THE INVENTION

In a conventional serial data system, symbols are transmitted sequentially, with the frequency spectrum of each data symbol allowed to occupy the entire bandwidth. A parallel data transmission system is one in which several sequential streams of data are transmitted simultaneously. In a parallel system, the spectrum of an individual data element normally occupies only a small part of the available bandwidth.

In a classic parallel data system, the total signal frequency band is divided into N overlapping frequency subchannels. Each subchannel is modulated with a separate symbol. The subchannels are then multiplexed.

Orthogonal signals can be separated at the receiver by using correlation techniques, eliminating inter-symbol interference. This can be achieved by carefully selecting carrier spacing so as to let the carrier spacing equal the reciprocal of the useful symbol period. Orthogonal Frequency Division Multiplexing (OFDM) is a form of multicarrier modulation wherein carrier spacing is selected so that each subcarrier is orthogonal to the other subcarriers.

This orthogonality avoids adjacent channel interference and prevents the demodulators from seeing frequencies other than their own. The benefits of OFDM are high spectral efficiency, resiliency to Radio Frequency (RF) interference, and lower multi-path distortion.

In OFDM the subcarrier pulse used for transmission is chosen to be rectangular. This has the advantage that the task of pulse forming and modulation can be performed by a simple Inverse Discrete Fourier Transform (IDFT) which can be implemented very efficiently as an Inverse Fast Fourier Transform (IFFT). Therefore, the receiver only needs a FFT to reverse this operation.

Incoming serial data is first converted from serial to parallel and grouped into x bits each to form a complex number. The number x determines the signal constellation of the corresponding subcarrier, such as 16 Quadrature Amplitude Modulation. The complex number are modulated in a baseband fashion by the IFFT and converted back to serial data for transmission. A guard symbol is inserted between symbols to avoid inter-symbol interference (ISI) caused by multi-path distortion. The discrete symbols are converted to analog and low-pass filtered for RF up-conversion. The receiver then simply performs the inverse process of the transmitter.

Figure 1:
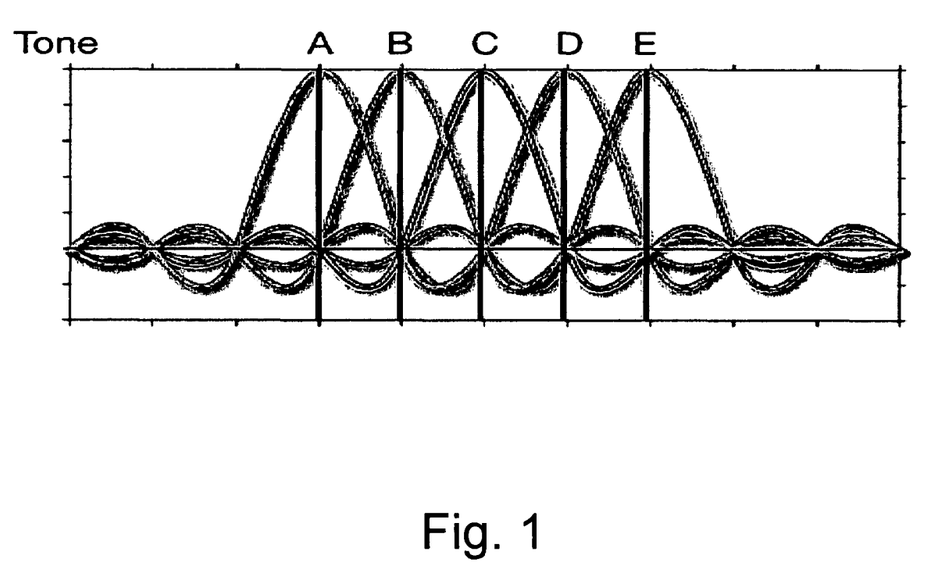
FIG. 1 shows an OFDM signal.

According to the theorems of the Fourier Transform the rectangular pulse shape will lead to a $\sin(x)/x$ type of spectrum of the subcarriers, as illustrated in FIG. 1. The spectrums of the subcarriers are not separated but overlap. The reason why the information transmitted over the carriers can be separated is the orthogonality relation. By using an IFFT for modulation, the spacing of the subcarriers is chosen such that at the frequency where a received signal is evaluated (indicated by letters A-E in FIG. 1) all other signals are zero.

The seminal article on OFDM is "Data Transmission by Frequency-Division Multiplexing Using the Discrete Fourier Transform", by S. B. Weinstein and Paul M. Ebert in *IEEE Transactions on Communication Technology*, Vol. com-19, No. 5, October 1971, the contents of which are hereby incorporated by reference.

OFDM forms the basis for the Digital Audio Broadcasting (DAB) standard in the European market as well as the basis for the global Asymmetric Digital Subscriber Line (ADSL) standard. Development is ongoing for wireless point-to-point and point-to-multipoint configurations for Wireless Local Area Networks using OFDM technology. In a supplement to the IEEE 802.11 standard, the IEEE 802.11 working group published IEEE 802.11a, which outlines the use of OFDM in the 5.8-GHz band.

In a packet communication system, data that is communicated is first into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

A structured data format is set forth in the present promulgation of the operating specification. The data format of a data packet formed in conformity with the IEEE 802.15.3a includes a preamble part and a payload part. Other packet communication systems analogously format data into packets that also include a preamble part and a payload part. The payload part of the packet contains the information that is to be communicated. That is to say, the payload part is non-determinative. Conversely, the preamble part of the data packet does not contain the informational content that is to be communicated but, rather, includes determinative data that is used for other purposes. In particular, the preamble part of an IEEE 802.15.3a packet preamble includes three parts, a packet sync sequence, a frame sync sequence, and a channel estimation sequence. The packet sync sequence is of a length of twenty-one OFDM (symbols), the frame sync sequence is of a length of three OFDM symbols, and the channel estimation sequence is of a length of six OFDM symbols. Collectively, the sequences are of a time length of 9,375 microseconds.

Of particular significance, the preamble also is used for channel estimation. The radio channel upon which the packet is communicated undergoes reflections and is otherwise distorted during its communication to the receiving station. To receive the transmitted data correctly, the receiving station must be provided with a good estimate of the channel to permit proper compensation to be made of the channel. The channel estimation sequence is a known waveform that tells the receiver what the channel looks like. From this known waveform, the receiver can properly compensate the channel to help decode the unknown data sequences.

Wireless systems such as ultra-wideband (UWB) system operate in unlicensed bands. Therefore, other devices in the band may generate interfering signals. Current approaches for wireless systems attempt to identify other homogeneous networks and avoid them. One system has a wireless local area network application protocol (WLAN AP) that can be put into automatic mode to select a frequency that avoids interference with other WLAN networks. However, this approach is not as applicable to UWB systems due to the large frequency bandwidth of the UWB spectrum. For UWB systems, some degree of interference is unavoidable and has to be accepted and dealt with by the receiver.

Therefore it would be desirable to have a method for distinguishing between signal interference and noise and mitigating the effects of such interference for UWB wireless communications systems.

SUMMARY OF THE INVENTION

Figure 4:
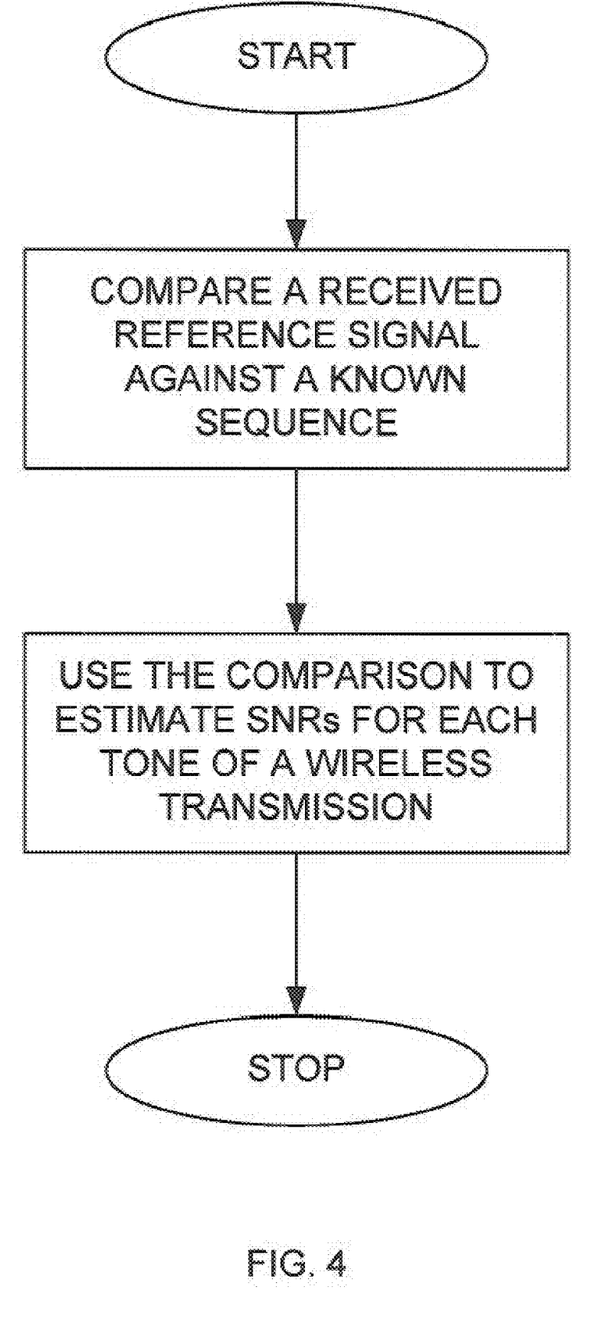
FIG. 4 shows a method according to one embodiment.

The present invention provides a method and apparatus for detecting interference in a wireless communications system. The invention compares the receiver FFT output of a received signal against known sequences such as the packet synchronization sequence, frame synchronization sequence, and channel estimation sequence. By comparing the reference signal to the known sequences, the invention estimates the instantaneous signal to noise ratio (SNR) for each tone of a wireless transmission. See, for example, the flow chart of FIG. 4. Large deviations from this estimate after transmission has begun indicate the appearance of an interfering signal rather than noise. To improve the SNR estimate, the invention computes a weighted average across multiple OFDM symbols. The invention looks for significant increases (spikes) in the SNR as a way of distinguishing interfering signals from noise. The invention can store separate SNR estimates for each transmitter in a wireless network.

One embodiment of the invention uses Viterbi branch metrics in conjunction with the estimated SNR to determine the presence of an interfering signal. If interference is detected the invention feeds the inverse of the SNR estimate into the Viterbi decoder or declares and erasure for that symbol.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION

The present invention is an enhancement to wireless OFDM systems that determines the signal to noise ration (SNR) on each tone across the band, which allows the system to distinguish between interference and noise. The profile of the SNR (i.e. signal quality) is then used to detect and mitigate signal interference at the receiver.

The invention monitors the SNR on each tone in an OFDM system by monitoring the output of the Discrete Fourier Transform/Fast Fourier Transform (DFT/FFT) blocks at the receiver. The invention may use a weighted average for the SNR estimate across multiple OFDM symbols, and multiple SNR estimates may be stored for each device from which a transmission is received. In addition, Forward Error Correction (FEC) decoder metrics may be weighted in a manner that decreases the error probability based on the per tone SNR estimate.

The estimate of the SNR is a key parameter used by the present invention for detecting interference and distinguishing it from background noise. In wireless systems such as the Multi-Band OFDM Alliance (MBOA) draft for IEEE 802.15.3a, the Physical Layer Convergence Procedure (PLCP) preamble typically consists of three distinct portions:

Packet synchronization sequence
Frame synchronization sequence
Channel estimation sequence Each of these sequences is known prior to transmission. Therefore, these sequences can be used to perform packet detection and acquisition, frequency estimation, and timing estimation. Additionally, these sequences can also be used to provide the initial estimate of the SNR at the receiver. The invention feeds the known sequences through the FFT and compares the output with the FFT output of a received reference signal to get an idea of what the SNR will look like at other frequencies. The output at the FFT is defined as:

$$R_{k,n}=H_{k,n}S_{n,k}+N_{k,n} \qquad \text{Equation 1}$$

where:
R is the received output from the FFT
H is the channel in the frequency domain
S is the transmitter
N is the noise in the frequency domain
k is the subcarrier index (FFT tone index)
n is the OFDM symbol #

After the channel estimation is performed, the invention can estimate the noise and its power across each subcarrier of an OFDM symbol associated with the channel estimation sequence. The estimated noise is defined as:

$$\hat{N}_{k,n}=R_{k,n}-\hat{H}_{k,n}S_{n,k} \qquad \text{Equation 2}$$

The noise power (variance) is defined as:

$$\hat{\sigma}^2 = \frac{1}{KN}\sum_k \sum_n |\hat{N}_{k,n}|^2 \qquad \text{Equation 3}$$

where:
$\hat{\sigma}^2$ is the estimated variance
$\hat{N}$ is the estimated noise
K is the sum over all k's (which would be 128 for a 128-pt FFT)
N is the sum over all OFDM symbols (n's)

In addition, an estimate of the noise power can be found from the gain accumulator for the automatic gain control (AGC). The AGC is a receiver function that generates constant power output under varying power input. During packet acquisition, prior to packet detection, the gain accumulator for the AGC contains an estimate of the total noise power. After a packet has been detected, the gain accumulator contains an estimate of the total signal plus noise power.

The instantaneous SNR per tone for the payload can be approximated as:

$$SNR_{k,n} = \frac{|R_{k,n}|^2}{\hat{\sigma}^2} - 1 \qquad \text{Equation 4}$$

The invention looks for significant increases (spikes) in the SNR as a way of distinguishing interfering signals from noise. Specifically, the invention is looking for interference that appears after the transmission has started, i.e. the interference becomes active later in the transmission or if the channel looks like an AWGN channel. This is because the invention uses the reference signals to get an initial estimate of the SNR per tone and the interference is detected as a change in this number.

Equation 4 is suitable as a quick estimate of the SNR. It is also an unbiased estimate. To improve this estimate, one can average over several OFDM symbols and packets.

The present invention also provides an algorithm that tracks the time variations of the SNR for a particular subcarrier, which is useful for determining when interference is introduced into the system. For the SNR to improve there should be a correlation between each estimate of the SNR. For this correlation to hold, the algorithm averages over the time-frequency code (TFC) per subcarrier over several OFDM symbols and packets.

Figure 2:
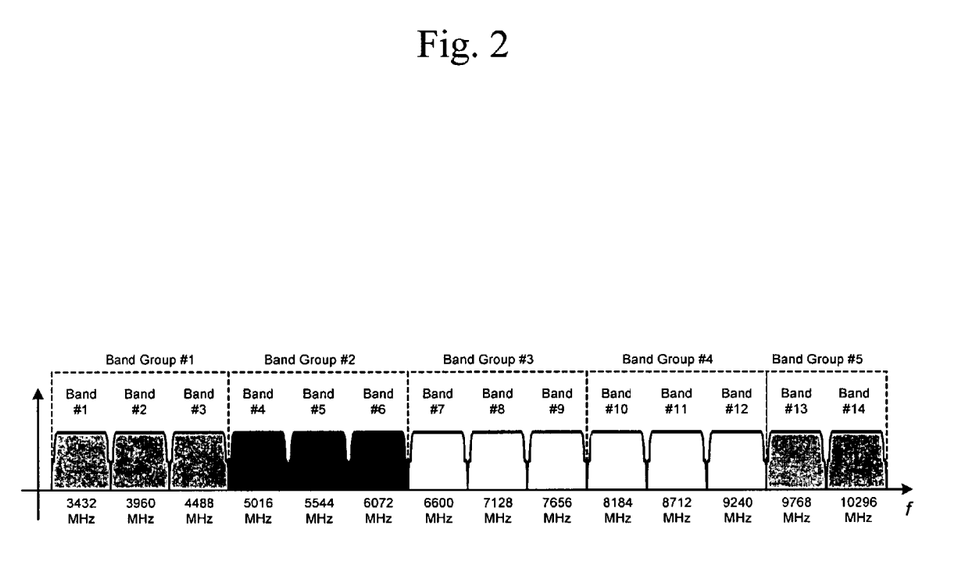
FIG. 2 shows the Multi-band OFDM Alliance plan for frequency bands and band groups of the Ultra-Wideband spectrum.

In ultra-wideband (UWB) OFDM systems the TFC is used to interleave coded data over three frequency bands (called a band group). As shown in FIG. 2, the MBOA proposal defines four such band groups with three bands each and one band group with two bands. There are also four 3-band TFCs and two 2-band TFCs. These band groups and the TFCs provide the capability to define 18 separate logic channels.

The information from the TFC averaging is stored for each TFC for each subcarrier. The averaging is computed as:

$$SNR_{k,n\varepsilon TFC}(m) = \alpha^{n-n_0} \frac{m-1}{m} SNR_{k,TFC}(m-1) + \frac{1}{m}\left[\frac{|R_{k,n\varepsilon TFC}|^2}{\hat{\sigma}^2} - 1\right] \qquad \text{Equation 5}$$

Where:

α is the forgetting factor n is the index for the next occurrence of the OFDM symbol for some TFC $n_0$ is a reference time index relative to the sampling time m is the total number of occurrences in the averages for the current estimate.

The forgetting factor α is determined from the coherence time of the channel, the OFDM symbol rate, and the TFC pattern. The coherence time is the time over which a propagating wave may be considered coherent (fixed phase relationship between corresponding points on the wave). These values are stored in a table that is communicated to the Media Access Control (MAC) for interference avoidance. Table 1 shows an example of an SNR estimate for a particular subcarrier:

TABLE 1

| Symbol Index | SNR estimate for the $k^{th}$ subcarrier (dB) | | |
|---|---|---|---|
| | TFC #1 | TFC #2 | TFC #3 |
| 1 | 12.89 | 7.86 | 11.08 |
| 4 | 14.15 | 8.43 | 22.6 |
| 6 | 13.78 | 6.09 | 23.33 |
| 10 | 10.56 | 9.13 | 13.45 |
| 12 | 16.2 | 10.1 | 11.34 |

The columns of Table 1 correspond to the TFC patterns the baseband processor (BBP) is monitoring, while the rows correspond to the number of symbol periods within a coherence time or packet length, whichever is smaller.

The example in Table 1 shows the detection of an interference signal for TFC #3. Whereas the SNR remains within a fairly narrow range for TFC #1 and #2, for TFC #3, there is a dramatic increase in the SNR from symbol index 1 to index 4 (11.08 to 22.6). The SNR for TFC #3 remains at this high level for symbol index 6, then decreases dramatically decreases for symbol index 10 (23.33 to 13.45). Assuming that these changes occur within the coherence time of the channel, one can deduce that a strong interfering source was present for OFDM symbol indexes 4 and 6. Similar behavior in the (k−1) and (k+1) subcarriers further reinforces the presumption of interference. Each initial SNR estimate is obtained from the PLCP header sequences.

In addition to the signal monitor at the FFT output, Viterbi branch metrics can be used in conjunction with the SNR estimate to determine whether an interfering signal is present.

Convolutional encoding with Viterbi decoding is a Forward Error Correction (FEC) technique that is particularly suited to a channel in which the transmitted signal is corrupted mainly by additive white Gaussian noise (AWGN), which is noise with a voltage distribution over time that can be described using a Gaussian statistical distribution (i.e. a bell curve). This voltage distribution has zero mean and a standard deviation that is a function of the SNR of the received signal. Assuming that the signal level is fixed, if the SNR is high, the standard deviation of the noise is small, and vice-versa. For digital communications, the SNR is usually measured in terms of $E_b/N_0$, which stands for energy per bit divided by the one-sided noise density.

For example, a bipolar non-return-to-zero (NRZ) signaling a system has a '1' channel bit that is transmitted as a voltage of −1V, and a '0' channel bit transmitted as a voltage of +1V. This is also called binary "antipodal" signaling. A comparator in the receiver determines that the received channel bit is a '1' if its voltage is less than 0V, and a '0' if its voltage is greater than or equal to 0V. Of course, the voltage values of the transmission are not going to be exactly −1V or +1V. There is a small distribution of voltages around the −1V and +1V values. The values under the curves are referred to as soft numbers. In practical systems, the received channel symbols are quantized with one or a few bits of precision in order to reduce the complexity of the Viterbi decoder. If the received channel symbols are quantized to one-bit precision (<0V=1, ≧0V=0), the result is called hard-decision data. If the received channel symbols are quantized with more than one bit of precision, the result is called soft-decision data. The usual quantization precision is three bits. More bits provide little additional improvement.

Mapping the one/zero output of the convolutional encoder onto an antipodal signaling scheme is a matter of translating zeroes to +1 s and ones to −1 s.

Viterbi decoding was developed by Andrew J. Viterbi. His seminal paper on the technique is "Error Bounds for Convolutional Codes and an Asymptotically Optimum Decoding Algorithm," *IEEE Transactions on Information Theory*, Volume IT-13, April 1967, pages 260-269, the contents of which are hereby incorporated by reference.

Figure 3A:
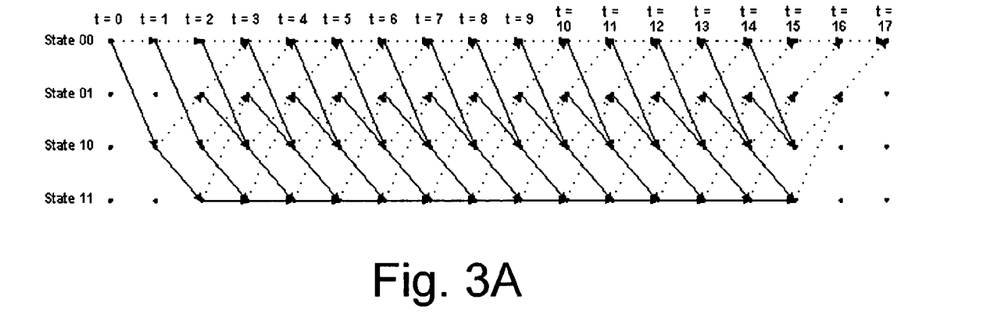
FIG. 3A shows the Viterbi trellis diagram for a 15-bit message from a convolutional encoder.

An important concept for understanding Viterbi decoding is the trellis diagram. FIG. 3A shows the trellis diagram for a rate ½K=3 convolutional encoder for a 15-bit message. The four possible states of the encoder are depicted as four rows of horizontal dots. There is one column of four dots for the initial state of the encoder and one for each time instant during the message. For a 15-bit message with two encoder memory flushing bits, there are 17 time instants in addition to t=0 (the initial state). The solid lines connecting the dots represent state transitions when the input bit is a one. The dotted lines represent state transitions when the input bit is a zero.

Figure 3B:
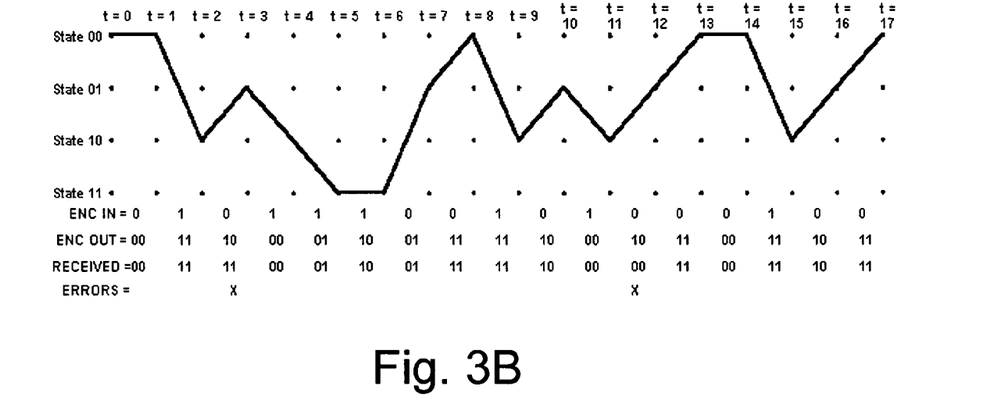
FIG. 3B shows the states of the trellis that are actually reached during the encoding of the example 15-bit message.

FIG. 3B shows the states of the trellis that are actually reached during the encoding of the example 15-bit message. The encoder input bits and output symbols are shown at the bottom of the diagram. In the present example, the received encoded message contains a couple of bit errors.

Each time a pair of channel symbols is received, the decoder computes a metric to measure the "distance" between what was in fact received and all of the possible channel symbol pairs that could have been received. Going from t=0 to t=1, there are only two possible channel symbol pairs that could have been received: $00_2$, and $11_2$. That is because the convolutional encoder was initialized to the all-zeroes state. Given one input bit=one or zero, there are only two states to transition to and two possible outputs of the encoder. These possible outputs of the encoder are $00_2$ and $11_2$.

The metric used for the present example is the Hamming distance between the received channel symbol pair and the possible channel symbol pairs. The Hamming distance is computed by simply counting how many bits are different between the received channel symbol pair and the possible channel symbol pairs. The results can only be zero, one, or two. Branch metrics are the Hamming distance values (or other metric) computed at each time instant for the paths between the states at the previous time instant and the states at the current time instant. In the example below, these results will be save as "accumulated error metric" values for the first time instant associated with states. For the second time instant on, the accumulated error metrics will be computed by adding the previous accumulated error metrics to the current branch metrics.

For each state, the predecessor that survives is the one with the lower branch metric. The operation of adding the previous accumulated error metrics to the new branch metrics, comparing the results, and selecting the smaller (smallest) accumulated error metric to be retained for the next time instant is called the add-compare-select (ACS) operation.

The decoding process begins by building the accumulated error metric for a specified number of received channel symbol pairs, and the history of what states preceded the states at each time instant t with the smallest accumulated error metric. The Viterbi decoder is then ready to recreate the sequence of bits that were input to the convolutional encoder when the message was encoded for transmission.

At a given trellis node that corresponds to a high SNR estimate, the metric should indicate one definitive lowest metric associated with a particular symbol; one of the metrics should be clearly distinguishable from the other metrics since all other paths would have a higher probability of error. In other words, the metric for that symbol at each state in the trellis should equal the noise residue, which is quite small given a high SNR condition. However, if all the metrics are clustered within a small variance about the mean for that node there is a strong likelihood that there is an interference signal present, given that there is a high SNR estimate for that symbol. If no such metrics are found, even if the SNR looks high, it means that the SNR was deceptive (i.e. there was interference instead of signal).

By observing how fast a channel is changing over time, the time reference $n_0$ provides the flexibility of weighting some samples more than others based on the time since the last update (i.e. a new packet rather than a new OFDM symbol). This allows the receiver to adapt its sensitivity for interference detection based on the time-varying channel conditions. Fast fading channels are weighted less than slow fading channels to allow channel variation and not confuse it with interference.

Once the coherence time for the channel has been exceeded the contents of Table 1 are over-written starting with the first row of entries or are reset to zero once the indexes have been issued.

Successful detection of the packet header allows the invention to store groups of tables similar to Table 1 for each device detected in the network (piconet). This information is provided to the MAC via feedback channels.

In the context of ultra-wideband (UWB) wireless communication, complete avoidance of interference is not practical due to the large frequency bandwidth of the UWB spectrum. Some degree of interference is unavoidable. If an interfering signal is detected, rather than attempting to avoid it, the present invention mitigates the effects of the interference at the receiver during signal decoding.

The ability to distinguish between a strong channel response and a potential interference signal is prerequisite to providing the right soft metric to the Viterbi decoding algorithm for a particular symbol. If there is no interference signal, the SNR estimate is fed directly into the Viterbi decoder. However, when an interference signal is detected, the present invention feeds the inverse of the SNR estimate into the Viterbi decoder, or alternatively, declares an erasure for that symbol. In this manner, the invention minimizes the error probability for each tone. The Viterbi decoder would otherwise make a wrong decision if the metric corresponding to the interference was fed into the decoder as one corresponding to a high SNR. The metric corresponding to the interference tones should have a very low value. Hence an erasure for those metrics helps minimize the error probabilities.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A method for detecting interference, the method comprising:
    comparing, by an apparatus, a received reference signal against at least one known sequence;
    estimating, by the apparatus, instantaneous signal-to-noise ratios for each tone of a plurality of tones of a wireless transmission based on the comparison; and
    detecting, by the apparatus, an interfering signal based on time variations of a signal-to-noise ratio for one of the plurality of tones,
    wherein the at least one known sequence comprises one of a packet synchronization sequence, a frame synchronization sequence, and a channel estimation sequence, and
    wherein the wireless transmission comprises an orthogonal frequency division multiplexing communication.

2. The method of claim 1, wherein a signal-to-noise ratio of a subsequently received signal that exceeds at least one of the estimated signal-to-noise ratios by a specified deviation indicates the presence of the interfering signal.

3. The method of claim 1, further comprising:
    mitigating, by the apparatus, the effects of the detected interfering signal during signal decoding.

4. The method of claim 3, wherein the mitigating further comprises using signal-to-noise ratio information per tone to mitigate the interfering signal.

5. The method of claim 4, further comprising feeding an inverse of at least one of the estimated signal-to-noise ratios into a Viterbi decoder.

6. The method of claim 3, wherein the mitigating further comprises declaring an erasure for a symbol.

7. The method of claim 1, wherein the comparing further comprises determining a Fast Fourier Transform output for the received reference signal and the at least one known sequence.

8. The method of claim 1, wherein the comparing further comprises comparing the received reference signal against multiple known sequences.

9. The method of claim 1, wherein the estimating further comprises estimating a noise for each tone of the plurality of tones.

10. The method of claim 1, wherein the estimating further comprises estimating a noise power for each tone of the plurality of tones.

11. The method of claim 1, further comprising averaging the estimated signal-to-noise ratios for each tone of the plurality of tones over multiple symbols.

12. The method of claim 11, wherein the estimated signal-to-noise ratios for each tone of the plurality of tones over multiple symbols is averaged over a time-frequency code (TFC).

13. The method of claim 11, further comprising weighting tones according to time-varying parameters.

14. The method of claim 11, further comprising storing separate signal-to-noise ratio estimates for each transmitter in a wireless network.

15. The method of claim 1, further comprising using Viterbi branch metrics in conjunction with at least one of the estimated signal-to-noise ratios to determine the presence of the interfering signal, wherein the absence of one definitive lowest metric associated with a particular symbol indicates the presence of the interfering signal.

16. A method for detecting and mitigating interference, the method comprising:
    comparing, by an apparatus, a received reference signal against at least one known sequence;
    estimating, by the apparatus, instantaneous signal-to-noise ratios for each tone of a plurality of tones of a wireless transmission, wherein a signal-to-noise ratio of a subsequently received signal that exceeds at least one of the estimated signal-to-noise ratios by a specified deviation indicates the presence of an interfering signal; and
    mitigating the effects of the interfering signal during signal decoding,
    wherein the at least one known sequence comprises one of a packet synchronization sequence, a frame synchronization sequence, and a channel estimation sequence, and
    wherein the wireless transmission comprises an orthogonal frequency division multiplexing communication.

17. An apparatus for detecting interference, the apparatus comprising:
    a comparator to compare a received reference signal against at least one known sequence;
    a processor to:
        estimate instantaneous signal-to-noise ratios for each tone of a plurality of tones of a wireless transmission based on the comparison; and
        detect an interfering signal based on time variations of a signal-to-noise ratio for one of the plurality of tones,
    wherein the at least one known sequence comprises one of a packet synchronization sequence, a frame synchronization sequence, and a channel estimation sequence, and
    wherein the wireless transmission comprises an orthogonal frequency division multiplexing communication.

18. The apparatus of claim 17, wherein a signal-to-noise ratio of a subsequently received signal that exceeds at least one of the estimated signal-to-noise ratios by a specified deviation indicates the presence of the interfering signal.

19. The apparatus of claim 17, wherein the processor
    mitigates the effects of the detected interfering signal during signal decoding.

20. The apparatus of claim 19, wherein the processor uses signal-to-noise ratio information per tone to mitigate the interfering signal.

21. The apparatus of claim 20, wherein the processor feeds an inverse of at least one of the estimated signal-to-noise ratios into a Viterbi decoder.

22. The apparatus of claim 19, wherein the processor further declares an erasure for a symbol.

23. The apparatus of claim 17, wherein the comparator determines a Fast Fourier Transform output for the received reference signal and the at least one known sequence.

24. The apparatus of claim 17, wherein the comparator compares the received reference signal against multiple known sequences.

25. The apparatus of claim 17, wherein the processor estimates a noise for each tone of the plurality of tones.

26. The apparatus of claim 17, wherein the processor estimates a noise power for each tone of the plurality of tones.

27. The apparatus of claim 17, wherein the processor further averages the estimated signal-to-noise ratios for each tone of the plurality of tones over multiple symbols.

28. The apparatus of claim 27, wherein the estimated signal-to-noise ratios for each tone of the plurality of tones over multiple symbols is averaged over a time-frequency code (TFC).

29. The apparatus of claim 27, wherein the processor weights tones according to time-varying parameters.

30. The apparatus of claim 27, wherein the processor stores separate signal-to-noise ratio estimates in a media access controller (MAC) for each transmitter in a wireless network.

31. The apparatus of claim 17, wherein the processor uses Viterbi branch metrics in conjunction with at least one of the estimated signal-to-noise ratios to determine the presence of the interfering signal, wherein the absence of one definitive lowest metric associated with a particular symbol indicates the presence of the interfering signal.

32. An apparatus for detecting interference, the apparatus comprising:
- a comparator to compare a received reference signal against at least one known sequence;
- a processor to:
  - estimate instantaneous signal-to-noise ratios for each tone of a plurality of tones of a wireless transmission based on the comparison; and
  - detect an interfering signal based on time variations of a signal-to-noise ratio for one of the plurality of tones, wherein a signal-to-noise ratio of a subsequently received signal that exceeds at least one of the estimated signal-to-noise ratios by a specified deviation indicates the presence of the interfering signal, wherein the processor mitigates the effects of any detected interfering signal during signal decoding, wherein the at least one known sequence comprises one of a packet synchronization sequence, a frame synchronization sequence, and a channel sequence, and wherein the wireless transmission comprises an orthogonal frequency division multiplexing communication.

33. A wireless receiver, the wireless receiver comprising:
- an antenna;
- a comparator to compare a reference signal received via the antenna against at least one known sequence; and
- a processor to:
  - estimate instantaneous signal-to-noise ratios for each tone of a plurality of tones of a wireless transmission based on the comparison; and
  - detect an interfering signal based on time variations of a signal-to-noise ratio for one of the plurality of tones,
- wherein the at least one known sequence comprises one of a packet synchronization sequence, a frame synchronization sequence, and a channel estimation sequence, and
- wherein the wireless transmission comprises an orthogonal frequency division multiplexing communication.

* * * * *